United States Patent
Hussey et al.

(10) Patent No.: US 8,076,813 B2
(45) Date of Patent: Dec. 13, 2011

(54) HERMETIC MOTORS WITH WINDINGS COUPLED TO ON-WINDING MOTOR PROTECTORS VIA WELDED TERMINALS

(75) Inventors: John H. Hussey, Oakville, MO (US); Vincent P. Fargo, St. Charles, MO (US); William L. Riggs, Russellville, KY (US)

(73) Assignee: Emerson Electric Co., Saint Louis, MO (US)

( * ) Notice: Subject to any disclaimer, the term of this patent is extended or adjusted under 35 U.S.C. 154(b) by 0 days.

(21) Appl. No.: 11/471,791

(22) Filed: Jun. 21, 2006

(65) Prior Publication Data

US 2007/0296288 A1 Dec. 27, 2007

(51) Int. Cl.
*H02K 1/00* (2006.01)
*H02K 3/00* (2006.01)
(52) U.S. Cl. .................... 310/179; 310/68 C; 310/71
(58) Field of Classification Search .................. 318/179, 318/473, 476; 337/55, 85, 90; 310/71, 179, 310/68 C; 29/753; 361/82
See application file for complete search history.

(56) References Cited

U.S. PATENT DOCUMENTS

| | | | | | |
|---|---|---|---|---|---|
| 2,870,294 | A | * | 1/1959 | Vander Pyl et al. | 337/85 |
| 2,874,344 | A | * | 2/1959 | Slocum | 318/783 |
| 3,903,456 | A | * | 9/1975 | Schaefer | 361/24 |
| 4,061,935 | A | * | 12/1977 | Kandpal | 310/68 C |
| 4,167,721 | A | * | 9/1979 | Senor et al. | 337/112 |
| 4,585,964 | A | * | 4/1986 | Hildebrandt | 310/71 |
| 4,791,329 | A | * | 12/1988 | Ubukata et al. | 310/68 C |
| 5,867,085 | A | * | 2/1999 | Kruck et al. | 337/380 |
| 5,903,418 | A | * | 5/1999 | Boivin et al. | 361/22 |
| 5,907,204 | A | * | 5/1999 | Matsushima et al. | 310/68 C |
| 6,433,975 | B1 | * | 8/2002 | Satoh et al. | 361/23 |
| 6,639,502 | B2 | * | 10/2003 | Herrick | 337/102 |
| 6,779,254 | B1 | * | 8/2004 | Herr et al. | 29/753 |
| 2002/0135452 | A1 | * | 9/2002 | White et al. | 337/104 |
| 2002/0158746 | A1 | * | 10/2002 | Lamborghini et al. | 337/365 |

FOREIGN PATENT DOCUMENTS

| | | | | |
|---|---|---|---|---|
| JP | 07231596 | A | * | 8/1995 |
| JP | 09023603 | A | * | 1/1997 |
| JP | 09051652 | A | * | 2/1997 |
| JP | 411-265814 | A | * | 9/1999 |
| JP | 2003180048 | A | * | 6/2003 |

OTHER PUBLICATIONS

Machine translation of foreign document JP2003180048.*

* cited by examiner

*Primary Examiner* — Quyen Leung
*Assistant Examiner* — Alex W Mok
(74) *Attorney, Agent, or Firm* — Harness, Dickey & Pierce, P.L.C.

(57) ABSTRACT

A hermetic motor includes a stator having at least one winding formed by a winding wire, and an on-winding motor protector having at least one contact. To improve the reliability and reduce the cost of the hermetic motor, the winding wire is directly coupled (without a lead wire) to the motor protector contact. Additionally, a common wire extending from the motor protector to a cluster block (if applicable) can be the same type of wire as the winding wire.

17 Claims, 2 Drawing Sheets

HERMETIC MOTORS WITH WINDINGS COUPLED TO ON-WINDING MOTOR PROTECTORS VIA WELDED TERMINALS

FIELD

The present disclosure relates to electric motors, and more specifically to hermetic motors having on-winding motor protectors.

BACKGROUND

The statements in this section merely provide background information related to the present disclosure and may not constitute prior art.

A variety of electric motors commonly include on-winding motor protectors, such as line break automatic reset control devices. Such protectors are connected in series with the motor windings, and are typically designed to track winding temperatures and respond to changes in line current to provide protection against overload conditions.

The manner in which on-winding motor protectors are connected to motor windings typically depends on the motor size and/or type. For example, in small dishwasher motors using stranded winding wire, the winding wire is sometimes coupled directly to the motor protector via a splice terminal. One end of the splice terminal is crimped to the stranded winding wire, and the other end of the splice terminal is crimped to a pin of the motor protector.

In contrast, hermetic motors for air conditioning, refrigeration and other applications generally require more robust connections to motor protectors due to the higher currents involved in such applications. Therefore, motor protectors for hermetic motors are commonly supplied by their manufacturers with a lead wire welded to each of the one or more steel pins, and another lead wire (common) welded to the motor protector housing (also referred to as the protector shell or dome). The lead wires are typically stranded (versus solid) wire and have a heavy braided insulation such as DMD (Dacron-Mylar-Dacron) insulation. The lead wires are usually coupled to the steel pins and housing of a motor protector using weld nuggets and resistance welding. The length, wire size and strip length of the lead wires can usually be selected as desired for a particular application when ordering the motor protectors. The motor protectors are integrated into electric motors by coupling the other ends of the lead wires (opposite the ends welded to the motor protector) in series with the motor windings or, in the case of a common lead wire, to a cluster block for the hermetic motor.

As recognized by the present inventors, such use of lead wires in hermetic motors introduces two potential points of failure in the winding connections, and can increase manufacturing costs due to the additional steps of attaching the lead wires to the winding wires and to the motor protector.

SUMMARY

To improve the reliability and reduce the cost of a hermetic motor employing an on-winding motor protector, the hermetic motor's winding wires can be directly coupled (without lead wires) to the on-winding motor protector.

According to one aspect of the present disclosure, a hermetic motor includes a stator having at least one winding formed by a winding wire, and an on-winding motor protector having at least one contact. The winding wire is directly coupled to the motor protector contact.

According to another aspect of the present disclosure, a method is provided for assembling a hermetic motor. The hermetic motor includes a stator having at least one winding formed by a substantially solid winding wire and an on-winding motor protector having at least one contact. The method includes directly coupling the substantially solid winding wire to the motor protector contact.

According to another aspect of the present disclosure, a hermetic motor includes a stator having a plurality of windings formed by at least a first winding wire and a second winding wire, and a motor protector having at least a first contact and a second contact. The first winding wire and the second winding wire are substantially solid and directly coupled to the first contact and the second contact, respectively, of the motor protector.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Corresponding reference numerals indicate like or corresponding parts and features throughout the drawings.

DETAILED DESCRIPTION

The following description is merely exemplary in nature and is not intended to limit the present disclosure nor its potential applications.

Figure 1:
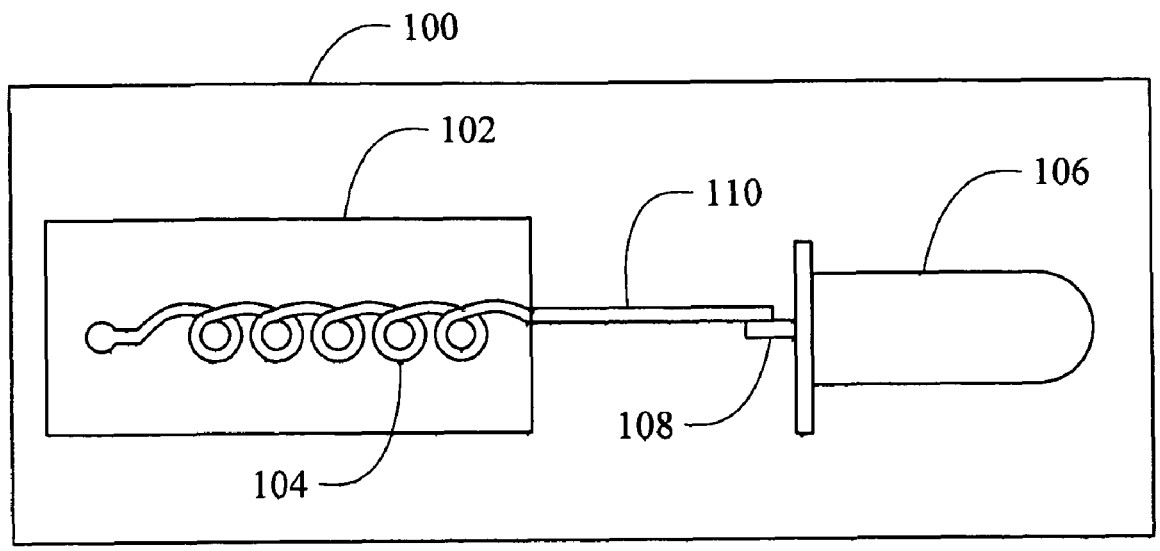
FIG. 1 is a block diagram of a hermetic motor having a winding wire directly coupled to a motor protector contact according to one embodiment of the present disclosure.

A hermetic motor according to one embodiment of the present disclosure is illustrated in FIG. 1 and indicated generally by reference numeral 100. As shown in FIG. 1, the hermetic motor 100 includes a stator 102 having at least one winding 104, and an on-winding motor protector 106. The protector 106 includes a connection terminal or contact 108. The stator winding 104 is formed by a winding wire 110. As shown in FIG. 1, the winding wire 110 is directly coupled to the contact 108. By eliminating the lead wire commonly employed in the prior art to connect the winding wire 110 to the motor protector contact 108, at least one electrical connection is eliminated within the hermetic motor 100. Because each electrical connection represents a potential point of failure, eliminating one or more electrical connections within the motor 100 improves the reliability of the machine. Additionally, eliminating one or more lead wires and electrical connections reduces the material and manufacturing costs of the motor 100.

The winding wire 110 can be directly coupled to the motor protector contact 108 by way of a crimp, a weld, a splice terminal, solder or any other suitable means. The motor protector 106 can be a line break automatic reset control device, or any other type of on-winding motor protector. The motor 100 can be a single phase motor, in which case a single phase motor protector is employed. Alternatively, the motor 100 can be a three phase motor, in which case a three phase motor protector is used.

Figure 2:
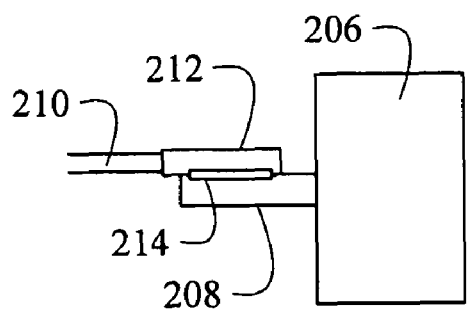
FIG. 2 is a block diagram illustrating a technique for directly coupling a winding wire to a motor protector contact in a hermetic motor using a splice terminal.

FIG. 2 illustrates one particular technique for directly coupling a winding wire to a motor protector contact 208 of a motor protector 206. According to this technique, a splice terminal 212 is crimped to the winding wire 210 and welded to the motor protector contact 208. In this manner, the winding wire 210 is directly coupled to the motor protector contact 208—via the splice terminal 212 and the weld 214—without using a lead wire.

The coupling technique described above with reference to FIG. 2 can be employed for coupling together dissimilar materials (although its potential applications are not so limited). It should be understood, however, that a wide variety of other means can be employed for directly coupling the winding wire 210 to the motor protector contact 208.

In one implementation, the winding wire 210 is a copper wire having a clear varnish coating that is generally non-conductive, the protector contact 208 is a steel pin, and the splice terminal 212 is a tin-plated brass Amplivar brand terminal having internal serrations (not shown). The splice terminal 212 is crimped to the winding wire 210 such that the internal serrations penetrate through the varnish coating and contact the underlying copper conductor. The splice terminal 212 is also welded to the motor protector contact 208 via resistance welding.

Figure 3:
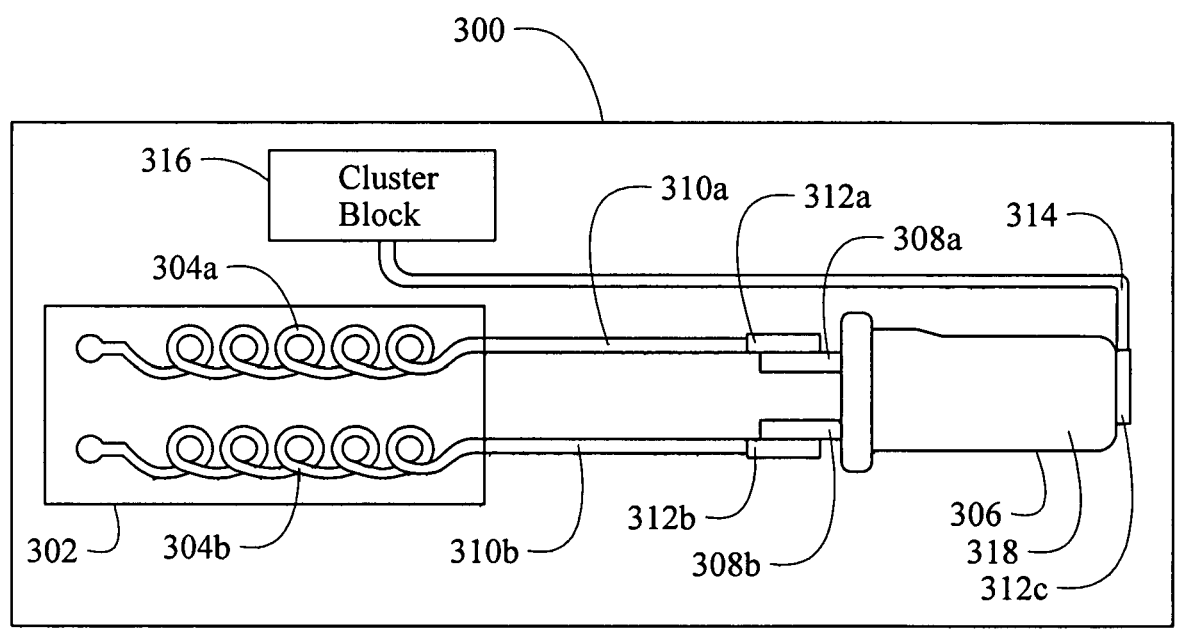
FIG. 3 is a block diagram of a hermetic single-phase PSC motor having winding wires and a common wire directly coupled to an on-winding motor protector.

FIG. 3 illustrates a hermetic permanent split capacitor (PSC) motor 300 according to another embodiment of the present disclosure. As shown in FIG. 3, the PSC motor 300 includes a stator 302 having a main winding 304a formed by a winding wire 310a and an auxiliary winding 304b formed by a winding wire 310b. The winding wires 310a and 310b—also referred to as magnet wires—are directly coupled (i.e., without lead wires) to contacts 308a and 308b of the on-winding protector 306, as further explained below. Also shown in FIG. 3 is a common wire 314 extending between a cluster block 316 and the dome or housing 318 of the motor protector 306.

In this particular embodiment, the winding wires 310a, 310b and the common wire 314 each comprise copper, and the protector contacts 308a, 308b and housing 318 comprise steel. Using the coupling technique of FIG. 2, the winding wires 310a, 310b and the common wire 314 are each directly coupled to the motor protector 306 using splice terminals 312a, 312b, 312c that are crimped to the wires and welded to the motor protector contacts 308a, 308b or housing 318 (for clarity, the weld joints are not shown in FIG. 3). Again, however, other means can be employed for directly coupling the winding wires 310a, 310b and/or the common wire 314 to the motor protector 306 without departing from the scope of this disclosure.

In the embodiment of FIG. 3, the common wire 314 is the same type of wire as winding wires 310a and 310b. As a result, there is no need for a motor manufacturer to stock an additional wire type for the common wire 314, in addition to the wire type(s) employed for the winding wires 310a, 310b. Further, by using the same type of wire for the common wire 314 as the winding wires 310a, 310b, the common wire 314 is typically less expensive and easier to work with, especially as compared to bulky DMD lead wire that is frequently used for common wires in the prior art.

In the specific embodiment of FIG. 3, the motor protector 306 is a hermetically sealed line break automatic reset control device. It should be understood, however, that other types of on-winding motor protectors can be employed without departing from the scope of this disclosure. Further, the PSC motor is preferably a hermetically sealed motor suitable for use in compressor, refrigeration and other high pressure applications.

Although described above with reference to single-phase motors, including single-phase PSC motors, those skilled in the art will appreciate that the teachings of this disclosure are not so limited. On the contrary, the teachings of this disclosure are applicable to other types of single-phase motors requiring main and/or start winding protection, as well as three-phase motors employing on-winding motor protectors (including three-phase line break protectors).

What is claimed is:

1. A hermetic motor comprising a stator having at least one winding formed by a winding wire, and an on-winding motor protector having a housing and at least one contact extending from an external side of the motor protector housing, wherein the winding wire is coupled to the motor protector by a terminal that is directly coupled to the winding wire without lead wire, and wherein said terminal is welded to the at least one contact on the external side of the motor protector housing.

2. The hermetic motor of claim 1 wherein the terminal is a splice terminal and the splice terminal is welded to the at least one contact.

3. The hermetic motor of claim 2 wherein the splice terminal is crimped to the winding wire.

4. The hermetic motor of claim 3 wherein the winding wire includes a coating and a substantially solid conductor, and wherein the crimped splice terminal extends through the coating and contacts the conductor.

5. The hermetic motor of claim 4 wherein the splice terminal includes internal serrations for penetrating the winding wire coating.

6. The hermetic motor of claim 1 further comprising a cluster block and a common wire having opposite first and second ends, wherein the first end of the common wire is coupled to the motor protector housing, and the second end of the common wire is coupled to the cluster block.

7. The hermetic motor of claim 6 wherein the common wire is a same type of wire as the winding wire.

8. The hermetic motor of claim 7 wherein the common wire and the winding wire each comprise copper.

9. The hermetic motor of claim 1 wherein the motor protector is a line break automatic reset control device.

10. The hermetic motor of claim 9 wherein the hermetic motor is a permanent split capacitor (PSC) motor.

11. A method of assembling a hermetic motor, the hermetic motor including a stator having at least one winding formed by a substantially solid winding wire and an on-winding motor protector having a housing and at least one contact extending from an external side of the housing, the method comprising coupling the substantially solid winding wire to the motor protector by coupling the substantially solid winding wire directly to a terminal without lead wire, and welding said terminal to the at least one contact on the external side of the motor protector housing.

12. The method of claim 11 wherein coupling the winding wire to a terminal includes crimping a splice terminal to the winding wire, and wherein welding the terminal to the motor protector includes welding the splice terminal to the at least one contact.

13. The method of claim 11 wherein the hermetic motor includes a cluster block and a common wire having opposite first and second ends, the method further comprising coupling the first end of the common wire to the motor protector housing and coupling the second end of the common wire to the cluster block.

14. The method of claim 13 wherein the common wire is a same type of wire as the winding wire.

15. A hermetic motor comprising a stator having a plurality of windings formed by at least a first substantially solid winding wire and a second substantially solid winding wire, and an on-winding motor protector having a housing and at least a first contact and a second contact extending from an external side of the housing, the first winding wire and the second winding wire directly coupled to a first terminal and a second terminal, respectively, without lead wire, and wherein said first terminal and said second terminal are welded to the first contact and the second contact, respectively, on the external side of the motor protector housing.

16. The hermetic motor of claim 15 wherein the hermetic motor is a single-phase PSC motor having a main winding formed by the first winding wire and an auxiliary winding formed by the second winding wire, and wherein the motor protector is a single-phase on-winding motor protector.

17. The hermetic motor of claim 15 wherein the motor is a three-phase motor and the motor protector is a three-phase on-winding motor protector.

* * * * *